○ : COMPOSITIONS OF EXAMPLES OF EMBODIMENT

▨ : CLAIMED CONTENTS OF Mg, Si

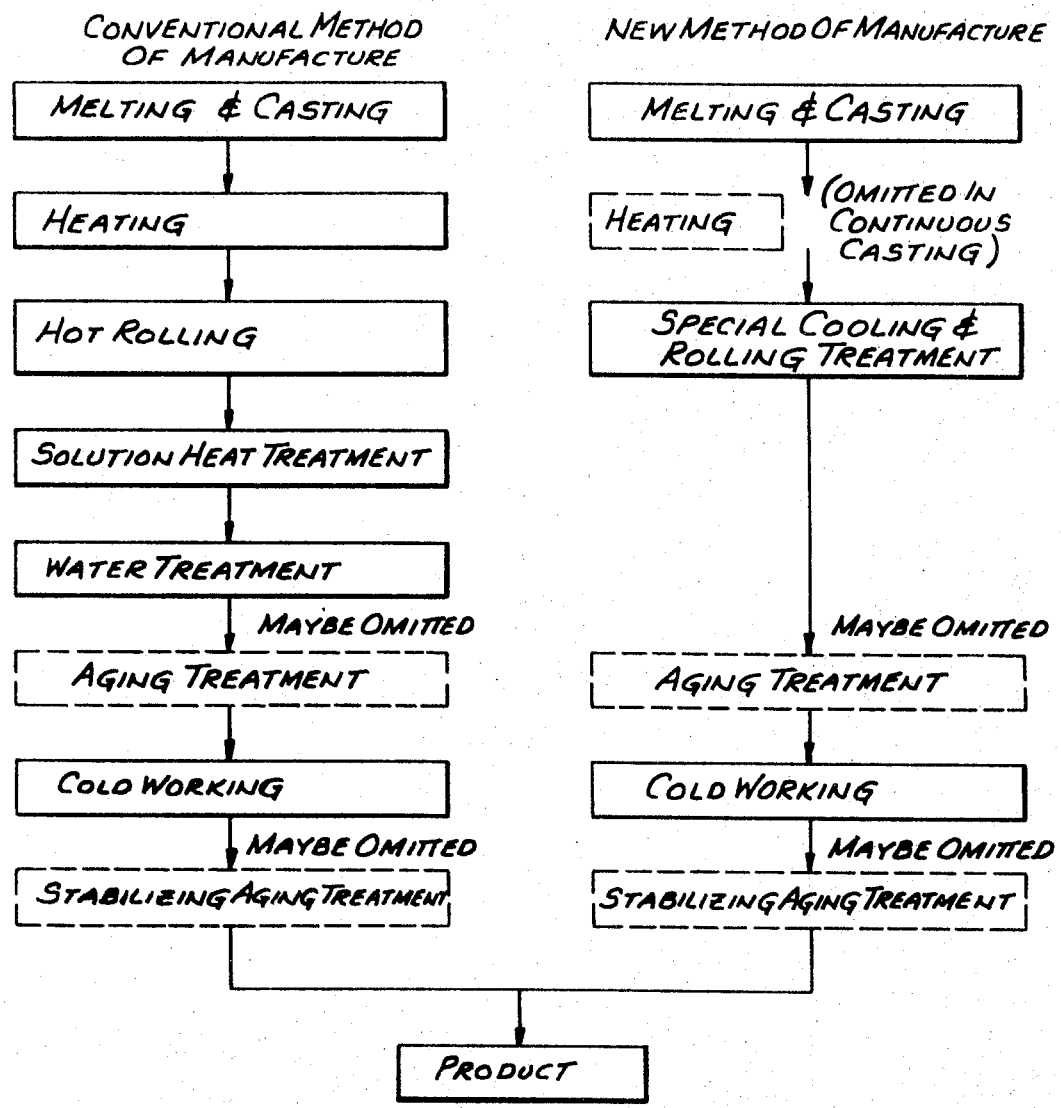

3,843,418
ALUMINUM ALLOYS FOR ELECTRICAL CONDUCTORS AND METHOD THEREOF
Kyuya Oida, Ikuo Hatano, and Megumu Sumitomo, Nagoya, Hiroshi Oasa, Osaka, and Minoru Yokota, Amagasaki, Japan, assignors to Sumitomo Chemical Co., Ltd., and Sumitomo Electric Industries, Ltd., both of Osaka, Japan
Original application July 23, 1970, Ser. No. 57,626, now abandoned. Divided and this application Oct. 17, 1972, Ser. No. 298,427
Int. Cl. C22f 1/04
U.S. Cl. 148—12.7
6 Claims

ABSTRACT OF THE DISCLOSURE

This invention provides an alloy which consists of 0.2 to 1.2 wt.-percent magnesium, 0.1 to 0.9 wt.-percent silicon, 0.0005 to 0.4 wt.-percent beryllium and the balance aluminum, and which is required to be subjected to solution heat treatment after hot working, followed by quenching, aging, cold working, etc. It has been discovered that it is possible to endow it with excellent aging characteristics by carrying out a special cooling and rolling treatment down to the neighborhood of normal temperatures while cooling it from the solution heat treatment temperature at a cooling rate of 1° C./second or more, instead of carrying out said hot rolling and quenching, and by cold rolling with at least 10% reduction between 100° C. and the normal temperature as done by this treatment. This invention provides high strength aluminum alloys for electric conductors which have excellent combined properties with respect to strength, ductility and electrical conductivity.

CROSS REFERENCE

Figure 1:
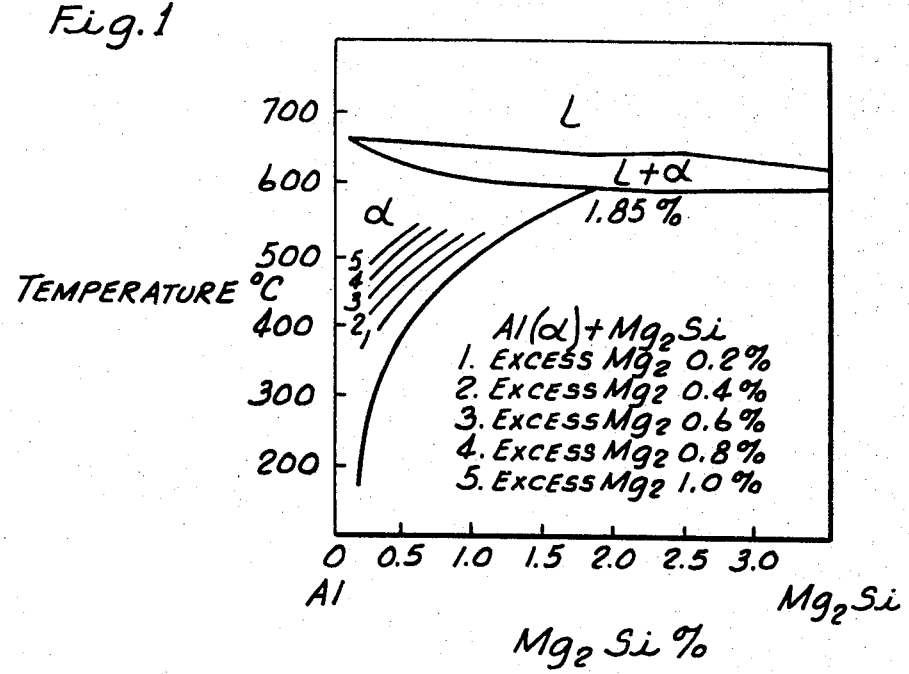

This application is a divisional application of Application Ser. No. 57,626 filed July 23, 1970, and now abandoned.

DETAILED DESCRIPTION OF THE INVENTION

This invention relates to aluminum alloys for electric conductors which have high strength, high ductility and high electrical conductivity best-suited for use as all aluminum alloy conductors (AAAC), aluminum conductors aluminum alloy reinforced (ACAR) and aluminum alloy conductors steel-reinforced for overhead transmission and distribution lines as well as conductors for various kinds of electrical machines and appliances, and the manufacturing method thereof.

This invention further relates to age hardened type aluminum alloys for electric conductors. High strength aluminum alloys for electric conductors may be classified under two major categories—that is to say, Al-Mg alloys which are alloys of the work hardened type (Alloy-5005) and Al-Mg-Si alloys which are alloys of the age hardened type (Alloy-6201, Aldrey, etc.) The alloys of the former type have an advantage in that they do not require heat treatment in the manufacturing process while on the other hand they have a drawback in that they are not quite satisfactory with respect to electrical conductivity and ductility. The alloys of the latter type have had disadvantages in that they require, after hot working, several heat treatments such as solution heat treatment, water quenching and aging, so that the cost of the heat treatments is high, and further in that they are somewhat unsatisfactory with respect to electrical conductivity and strength.

This invention relates to the improvement of the Al-Mg-Si alloys with respect to the afore-mentioned disadvantages. It relates to high strength aluminum alloys for electric conductors which have excellent combined properties with respect to strength, ductility, electrical conductivity, workability, corrosion-proofness, etc., and which can be manufactured at a low cost. It also relates to a manufacturing method thereof.

As noted, this invention relates to an improvement on Al-Mg-Si alloys of the age hardened type for electric conductors. Generally speaking, Al-Mg-Si alloys are excellent in corrosion-proofness, electrical conductivity, workability and strength. They are alloys which have achieved remarkable development in recent years not only as structural material for constructions, but also as material for electric conductors. The alloys of this type are alloys which can usually acquire the greatest strength by giving them quenching and aging treatments ($T_6$ treatment) or quenching, cold working and aging treatments ($T_8$ treatment). Since some time ago studies have been made of the effects of various additive elements to improve their aging characteristics, but no additive elements and methods desirable for their use as electric conductors have yet been established. For example, the addition of copper is considered effective to improve their strength and is carried out for practical purposes for some structural materials. However, the addition of copper does not seem to occur for use in electric conductors, because it markedly affects their electrical conductivity detrimentally and also lowers their resistance to corrosion. Silver is also known as an additive to improve strength. However, it does not seem to be in practical use for electric conductors, since it degrades their electrical conductivity and further, silver is expensive. In addition to high electrical conductivity, aluminum alloys for electric conductors are required to have high strength, high electrical conductivity, high workability for working them into fine wires, high ductility, corrosion-proofness and dependability for withstanding protracted use for tens of years, etc., which are special properties different from those required of structural material in general. Furthermore, their manufacturing method must be one adaptable to a highly modernized high speed tandem manufacturing line.

The present inventors have discovered that by adding a very small quantity of beryllium to Al-Mg-Si alloys and by carrying out the afore-mentioned special cooling and rolling process, it is possible to omit or shorten the heat treatment and to manufacture excellent high strength aluminum alloys for electric conductors which have excellent combined properties with respect to strength, ductility, electrical conductivity, etc.

Now this invention will be explained in detail, with reference to the accompanying drawings.

FIG. 1 is an equilibrium phase diagram of Al-Mg-Si alloys.

Figure 2:
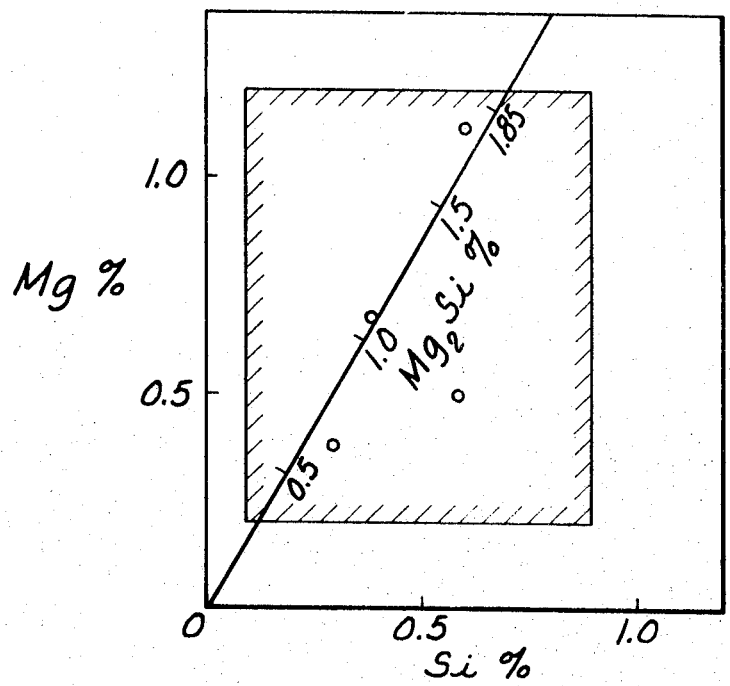

FIG. 2 graphically shows the relationship between the quantities of magnesium and silicon and the quantity of $Mg_2Si$ in aluminum alloys and shows the composition in the examples of embodiment described later.

FIG. 3 is a flow chart showing the manufacturing processes of this invention and the conventional method.

This invention provides high strength aluminum alloys for electric conductors which are excellent in strength and ductility, the age hardening property is improved without detrimental effect on electrical conductivity by adding a very small quantity of beryllium to an Al-Mg-Si alloy for electric conductors. The composition of the alloys of the present invention ranges over 0.2 to 1.2 wt.-percent magnesium, 0.1 to 0.9 wt.-percent silicon, 0.0005 to 0.4 wt.-percent beryllium, and the balance aluminum. Here the maximum quantity of magnesium is specified at 1.2% and the maximum quantity of silicon as 0.9%, because, in FIG. 1, the equilibrium diagram of Al-$Mg_2Si$ alloys, the quantity of magnesium corresponding to the maximum solid solution quantity of $Mg_2Si$, 1.85%, is approximately 1.2%. The quantity of silicon, 0.9%, is the quantity which makes silicon about 0.2% in excess for the quantity of Mg₂Si of 1.85%. This is because, with respect to Al-Mg-Si alloys, those on the excessive silicon side are generally superior in aging characteristics. In case magnesium is more than 1.2%, or silicon is more than 0.9%, the electrical conductivity and workability become poorer and such alloys have no advantages as material for electric conductors.

The reason why the minimum quantity of magnesium is specified as 0.2% and the minimum quantity of silicon as 0.1% is that no age hardening effect is observed where their quantities are less than these values respectively.

The reason why the maximum quantity of beryllium added is specified as 0.4% is as follows: Even if the quantity is increased over this value, it will merely affect the electrical conductivity detrimentally and offer no advantage from the viewpoint of cost, either. The reason why the minimum quantity is specified as 0.0005% is because no improvement caused by the addition of beryllium with respect to age hardening and ductility can be observed if the quantity is less than this value.

Co-existence with impurities generally contained in Al-Mg-Si alloys or with elements added for the purpose of making crystalline grains finer or of improving the age hardening property or resistance to corrosion, for example Fe, Ti, B, V, Mn, Cr, Cu, Ag, Au, Sb, etc., is quite permissible.

It is widely known that beryllium has been added to Al-Mg-Si-Zn alloys etc. for casting use for the purpose of improving castability, making crystalline grains finer and removing the evil effects of Fe. It has also been reported that a very small quantity of beryllium was added to some of the Al-Mg-Si alloys for structural uses and its effect on age hardening was investigated. However, there is found no instance where Al-Mg-Si alloys for electric conductors were taken up for a combined investigation of their electrical conductivity, ductility, age hardening property, etc., whereby the marked effect of the addition was revealed.

Now, the manufacturing method to ensure the excellent properties of the alloys of this invention will be described.

The method of manufacturnig the Al-Mg-Si alloys of this invention as high strength aluminum alloys for electric conductors comprises processes as shown in FIG. 3.

First, the conventional method of manufacture is as follows: Alloys are melted by adding mother alloys of Al-Mg, Al-Si and Al-Be to aluminum for electrical uses and they then are cast. After casting, the alloys are heated to rolling temperature and then are hot rolled to wire rods. After hot rolling, it is heated and kept for several hours at an adequate temperature of solution heat treatment, and is then subjected to water quenching. After that, it is subjected to the aging treatment (this may be omitted; if this is omitted, it is subjected to the aging treatment at the final size) and to cold working to the final size. It is then subjected to the stabilizing aging treatment for recovering electrical conductivity and ductility to obtain finished products.

Next, the new manufacturing method of this invention will be explained. According to this manufacturing method, a special cooling and rolling treatment is made at the time of hot rolling of the conventional manufacturing method. It dispenses with the troublesome processes of solution heat treatment and water quenching required by the conventional manufacturing method and at the same time makes it possible to improve the properties greatly. It provides aluminum alloys for electric conductors which have excellent combined properties of strength, electrical conductivity, ductility, workability, etc. incomparable with those of other high strength aluminum alloys for electric conductors.

What is called here a special cooling and rolling treatment is the step of rolling while cooling at a cooling rate of 1° C./second or more from a suitable solution heat treatment temperature which can be adopted metallurgically in the equilibrium phase diagram of these Al-Mg-Si alloys shown in FIG. 1. It is characterized in that hot working, warm working and cold working, together with a certain degree of quenching effect, are applied to the material continuously one after another. Furthermore, the application of the cold working with 10% reduction or more at the temperature range from 100° C. down to the neighborhood of normal temperature during this special cooling and rolling treatment in order to obtain sufficient quenching effect and cold working effect also constitutes a part of this invention.

The reason why the cooling rate is specified to be 1° C./second or more is that the quenching effect and cold working effect which characterize this invention are not observed if the cooling rate is less than 1° C./second, while the effects are remarkable if the cooling rate is 3° C./second. There is no upper limit in particular to the cooling rate in this case. Neither is there any limit in particular for the total amount of working for hot working, warm working and cold working. What is called cold working here is not the working of the material under the recrystallization temperature (approximately 200° C. in the case of these Al-Mg-Si-Be alloys) which is the general metallurgical terminology. Instead, it means cold working at temperatures of 100° C. down to the neighborhood of normal temperature, where sufficient cold working strain can be accumulated in the material, and it is specified that the amount of this cold working reduction should be 10% or more. The reason why the working temperature is specified here as not exceeding 100° C. and the amount of working reduction not less than 10% is because sufficient cold working strain could not be accumulated if they were outside of these ranges respectively.

As has been described, what is called the special cooling and rolling treatment of this invention is a step wherein working is done while sufficient cooling is being done from the neighborhood of the solution treatment heat, in place of the hot rolling process of the conventional manufacturing method. Upon applying the quenching effect and cold working effect synergistically with the aforementioned effect of the addition of a small quantity of beryllium, high strength aluminum alloys for electric conductors which have excellent properties are provided.

Now the invention will be explained in detail, with reference to examples. However, it is not intended to limit the invention.

Example 1

Al-Mg-Si-Be-(Cu) alloys of various compositions were made by adding mother alloys of Al-10% Mg, Al-15% Si, Al-4% Be and Al-4% Cu to aluminum for electrical purposes of a 99.7% purity. After casting in a metallic mold of 25 mm. diameter x 300 mm., wires of 1 mm. in diameter were obtained by hot forging and cold drawing, and were used as specimens. The wire of 1 mm. in diameter was subjected to solution heat treatment at 530° C. for 1.5 hours, and, after quenching, subjected to aging treatment under various aging conditions. Then the electrical conductivity, tensile strength and elongation were measured. The measurement of electrical conductivity was made with a sample of a 50 cm. length, and elongation was measured with a gauge length of 50 mm. Some of the results thus obtained are given in Table 1. Their magnesium content and silicon content are shown in FIG. 2.

In Table 1, the alloys without an addition of beryllium and the alloys with an addition of beryllium are differentiated, marked by A and B respectively.

TABLE 1

| Number | | Composition, percent | | | Aging conditions | Properties | | |
|---|---|---|---|---|---|---|---|---|
| | | Mg | Si | Be | | Tensile strength, kg./mm.² | Elongation, percent [a] | Electrical conductivity, percent, IACS |
| 1 | A | 0.35 | 0.30 | | 140° C. x 0.25 hr | 11.5 | 5.4 | 55.6 |
| | B | 0.35 | 0.30 | 0.02 | | 18.2 | 4.8 | 55.4 |
| 2 | A | 0.35 | 0.30 | | 140° C. x 1 hr | 11.6 | 5.6 | 55.5 |
| | B | 0.35 | 0.30 | 0.02 | | 16.2 | 3.8 | 55.6 |
| 3 | A | 0.35 | 0.30 | | 140° C. x 6 hrs | 15.0 | 3.0 | 55.9 |
| | B | 0.35 | 0.30 | 0.02 | | 21.4 | 2.8 | 56.0 |
| 4 | A | 0.35 | 0.30 | | 140° C. x 100 hrs | 19.3 | 0.7 | 58.0 |
| | B | 0.35 | 0.30 | 0.02 | | 21.6 | 0.8 | 57.8 |
| 5 | A | 0.35 | 0.30 | | 165° C. x 0.25 hr | 11.7 | 7.0 | 55.4 |
| | B | 0.35 | 0.30 | 0.02 | | 15.9 | 4.9 | 55.9 |
| 6 | A | 0.35 | 0.30 | | 165° C. x 1 hr | 13.4 | 6.1 | 55.5 |
| | B | 0.35 | 0.30 | 0.02 | | 18.1 | 4.9 | 56.0 |
| 7 | A | 0.35 | 0.30 | | 165° C. x 6 hrs | 14.6 | 2.3 | 55.9 |
| | B | 0.35 | 0.30 | 0.02 | | 20.5 | 3.6 | 56.6 |
| 8 | A | 0.35 | 0.30 | | 165° C. x 100 hrs | 22.9 | 1.7 | 57.8 |
| | B | 0.35 | 0.30 | 0.02 | | 25.6 | 6.9 | 57.8 |
| 9 | A | 0.35 | 0.30 | | 200° C. x 1 hrs | 14.7 | 1.8 | 56.2 |
| | B | 0.35 | 0.30 | 0.02 | | 21.1 | 4.3 | 57.5 |
| 10 | A | 0.50 | 0.60 | | 140° C. x 0.25 hr | 18.2 | 6.1 | 50.6 |
| | B | 0.50 | 0.60 | 0.05 | | 27.8 | 9.4 | 50.5 |
| 11 | A | 0.50 | 0.60 | | 140° C. x 1 hrs | 18.4 | 2.6 | 51.0 |
| | B | 0.50 | 0.60 | 0.05 | | 28.7 | 8.9 | 51.1 |
| 12 | A | 0.50 | 0.60 | | 140° C. x 6 hrs | 27.0 | 3.6 | 52.3 |
| | B | 0.50 | 0.60 | 0.05 | | 28.9 | 7.8 | 51.3 |
| 13 | A | 0.50 | 0.60 | | 140° C. x 100 hrs | 25.1 | 0.5 | 54.3 |
| | B | 0.50 | 0.60 | 0.05 | | 30.2 | 4.8 | 54.1 |
| 14 | A | 0.50 | 0.60 | | 165° C. x 0.25 hr | 14.0 | 2.6 | 51.2 |
| | B | 0.50 | 0.60 | 0.05 | | 27.0 | 9.3 | 51.2 |
| 15 | A | 0.50 | 0.60 | | 165° C. x 1 hr | 20.0 | 3.6 | 51.2 |
| | B | 0.50 | 0.60 | 0.05 | | 29.2 | 9.4 | 50.9 |
| 16 | A | 0.50 | 0.60 | | 165° C. x 6 hrs | 23.8 | 1.5 | 52.0 |
| | B | 0.50 | 0.60 | 0.05 | | 29.0 | 4.6 | 51.9 |
| 17 | A | 0.50 | 0.60 | | 165° C. x 100 hrs | 27.4 | 0.6 | 54.4 |
| | B | 0.50 | 0.60 | 0.05 | | 29.6 | 3.7 | 54.2 |
| 18 | A | 0.50 | 0.60 | | 200° C. x 1 hr | 21.0 | 0.6 | 53.3 |
| | B | 0.50 | 0.60 | 0.05 | | 29.7 | 7.2 | 53.0 |
| 19 | A | 0.70 | 0.40 | | 140° C. x 0.25 hr | 12.8 | 3.0 | 50.3 |
| | B | 0.70 | 0.40 | 0.2 | | 27.1 | 8.5 | 50.4 |
| 20 | A | 0.70 | 0.40 | | 140° C. x 1 hr | 18.6 | 7.2 | 50.2 |
| | B | 0.70 | 0.40 | 0.2 | | 29.3 | 9.9 | 50.5 |
| 21 | A | 0.70 | 0.40 | | 140° C. x 6 hrs | 18.9 | 0.7 | 50.2 |
| | B | 0.70 | 0.40 | 0.2 | | 30.1 | 6.5 | 50.9 |
| 22 | A | 0.70 | 0.40 | | 140° C. x 100 hrs | 21.9 | 0.4 | 53.3 |
| | B | 0.70 | 0.40 | 0.2 | | 31.0 | 5.2 | 53.2 |
| 23 | A | 0.70 | 0.40 | | 165° C. x 0.25 hr | 12.0 | 4.2 | 51.0 |
| | B | 0.70 | 0.40 | 0.2 | | 28.2 | 11.9 | 51.0 |
| 24 | A | 0.70 | 0.40 | | 165° C. x 1 hr | 12.7 | 1.7 | 51.0 |
| | B | 0.70 | 0.40 | 0.2 | | 29.6 | 11.4 | 50.9 |
| 25 | A | 0.70 | 0.40 | | 165° C. x 6 hrs | 19.2 | 2.8 | 51.4 |
| | B | 0.70 | 0.40 | 0.2 | | 29.7 | 8.4 | 51.4 |
| 26 | A | 0.70 | 0.49 | | 165° C. x 100 hrs | 24.6 | 0.5 | 53.0 |
| | B | 0.70 | 0.40 | 0.2 | | 31.6 | 5.6 | 52.8 |
| 27 | A | 0.70 | 0.40 | | 200° C. x 1 hr | 18.9 | 0.4 | 52.8 |
| | B | 0.70 | 0.40 | 0.2 | | 30.4 | 7.3 | 52.1 |
| 28 | A | 1.1 | 0.6 | | 140° C. x 1 hr | 24.6 | 3.7 | 47.3 |
| | B | 1.1 | 0.6 | 0.3 | | 28.3 | 1.1 | 47.5 |
| 29 | A | 1.1 | 0.6 | | 140° C. x 6 hrs | 27.3 | 0.9 | 48.4 |
| | B | 1.1 | 0.6 | 0.3 | | 32.3 | 1.3 | 48.2 |
| 30 | A[b] | 1.1 | 0.6 | | 165° C. x 1 hr | 22.6 | 3.6 | 48.0 |
| | B | 1.1 | 0.6 | 0.3 | | 29.6 | 3.3 | 48.2 |
| 31 | A[b] | 1.1 | 0.6 | | 165° C. x 6 hrs | 27.3 | 3.4 | 48.6 |
| | B | 1.1 | 0.6 | 0.3 | | 29.5 | 3.0 | 48.2 |
| 32 | A[b] | 1.1 | 0.6 | | 200° C. x 1 hr | 26.4 | 0.4 | 50.4 |
| | B | 1.1 | 0.6 | 0.3 | | 29.6 | 0.6 | 49.9 |

[a] G.L. 50mm.
[b] Additional element CU 0.23%.

First, with regard to No. 1–No. 9 alloys containing 0.35% magnesium and 0.30% silicon, it is noted that the addition of beryllium does not improve electrical conductivity and elongation, but evidently increases tensile strength to a great extent. For example, No. 1 Specimen A without an addition of beryllium has a tensile strength of 11.5 kg./mm.², elongation of 5.4% and electrical conductivity of 55.4% IACS, while No. 1 Specimen B with the addition of beryllium has values of 18.2 kg./mm.², 4.8% and 55.6% IACS respectively, showing a marked increase in tensile strength. Under the conditions of No. 8 specimen which produced the maximum strength, the alloy without the beryllium addition has a tensile strength of 22.9 kg./mm.², an elongation of 1.7% and electrical conductivity of 57.8% IACS, while the alloy with a beryllium addition shows values of 25.6 kg./mm.², 6.9% and 57.8% IACS respectively, showing a marked improvement in strength and elongation, with the electrical conductivity remaining unchanged.

Next, some explanation will be given about specimens No. 10–No. 18 which are alloys containing 0.50% magnesium and 0.60% silicon.

If A and B of each specimen are compared, it is noted that the B specimens containing beryllium show remarkable improvements in tensile strength by about 3 kg./mm.² to 13 kg./mm.² and in elongation by several percents in measurement values, while their electrical conductivity remains unchanged.

For example, the properties will be compared with specimen No. 16 which was subjected to the aging conditions of 165° C. x 6 hours, the aging condition which is most commonly employed. The specimen-A without addition of beryllium has a tensile strength of 23.8 kg./mm.², an elongation of 1.5% and electrical conductivity of 52.0% IACS. The specimen-B with the addition of beryllium has values of 29.0 kg./mm.², 4.6% and 51.9% IACS respectively. This shows that great improvement is obtained with respect to tensile strength and elongation, while electrical conductivity remains unchanged.

About the same tendency is observed with regard to specimens No. 1–No. 27 which are alloys containing 0.7% magnesium and 0.4% silicon. For example, under the aging condition of No. 25 of 165° C. x 6 hours, the specimen-A without an addition of beryllium had a tensile strength of 19.2 kg./mm.², an elongation of 2.8% and electrical conductivity of 51.4% IACS, while the specimen-B with an addition of beryllium had values of 29.7 kg./mm.², 8.4% and 51.4% IACS respectively, showing marked improvements.

Co-existence with an element, like copper, which is added for the purpose of improvement of aging characteristics is quite permissible. Specimens No. 28–No. 32 show instances where 0.3% beryllium was added to alloys containing 1.1% magnesium, 0.6% silicon and 0.23% copper. It is noted that tensile strength is improved by several kg./mm.², while electrical conductivity and elongation remain almost unchanged.

As started above, it has been made clear that by adding a very small quantity of beryllium to Al-Mg-Si alloys, their strength and elongation can be remarkably improved, without changing their electrical conductivity. Furthermore, it should be emphasized with respect to all of the various compositions and aging conditions of specimens No. 1–No. 32 that an addition of a small quantity of beryllium can greatly reduce the aging time if strength similar to that of the conventional Al-Mg-Si alloys is wanted. This may be said to be a great advantage for industrial production.

Example 2

As the result of study of various processes to obtain a high strength aluminum alloy for electric conductors, it has been discovered that high strength aluminum alloys for electric conductors can be manufactured by the following process. After solution heat treatment and water quenching, wire rods are cold worked with 10 to 30% reduction, then are aged at 160° C. to 200° C., and cold worked to the finishing size. Moreover, marked improvement in the results of these processes can be obtained by adding a very small quantity of beryllium. An instance where such results are obtained is shown in Table 2.

The specimens were prepared under the same conditions as in Example 1. Wires of 7 mm. in diameter were subjected to solution heat treatment at 530° C. x 1.5 hours, then water quenching was applied, and then, after cold working with 18% reduction at normal temperature, they were subjected to aging at 180° C. for 6 hours then cold working with about 91% reduction to the finished size of 1.9 mm. in diameter.

TABLE 2

| Number | Compositions, percent | | | Properties | | |
|---|---|---|---|---|---|---|
| | Mg | Si | Be | Tensile strength, kg./mm.² | Elongation, percent [a] | Electrical conductivity, percent, IACS |
| 33 ........ A | 0.30 | 0.30 | ........ | 28.1 | 1.9 | 58.3 |
| B₁ | 0.27 | 0.29 | 0.066 | 30.7 | 2.1 | 58.3 |
| B₂ | 0.30 | 0.27 | 0.10 | 32.0 | 1.8 | 58.2 |
| 34 ........ A | 0.49 | 0.53 | ........ | 37.2 | 1.2 | 55.3 |
| B₁ | 0.48 | 0.54 | 0.024 | 39.1 | 1.2 | 55.3 |
| B₂ | 0.49 | 0.53 | 0.20 | 40.1 | 1.2 | 55.3 |

[a] G.L. 200 mm.

As can be clearly seen from Table 2, the alloys $B_1$ and $B_2$ of this invention have a remarkably higher strength as compared with the alloys A of the prior art. Thus, the invention provides material which is best suited for use as conductors of longspan overhead transmission and distribution lines which are required to have high strength and high electrical conductivity. Where high ductility is required in particular, it is possible to improve ductility and electrical conductivity simultaneously by carrying out a stabilizing aging treatment at 100° C. to 150° C.

Perhaps it can be seen from Table 2 that the beryllium containing alloys, i.e., No. 33 $B_1$ and $B_2$ and No. 34 $B_1$ and $B_2$ have a highly excellent strength.

Example 3

150 mm. square casting bars of Al-Mg-Si-Be alloys of various compositions were given hot working, warm working and cold working one after another, while cooling them at various cooling rates from the neighborhood of 500° C. which was the solution heat temperature, and were given the special cooling and rolling treatment to 11.7 mm. diameter. Then they were given aging treatment under various conditions, and their electrical conductivity, tensile strength and elongation were measured. Some of the results are shown in Table 3, comparing their properties with those of the alloys of the prior art and of alloys made by an inadequate process such as cooling at excessively low speed.

Referring to Table 3, Nos. 35–No. 48 are allows made according to the present invention. They were subjected to hot working, warm working and cold working continuously one after another while being cooled from about 500° C. at a cooling rate of approximately 3° C./second, the cold working between 100° C. and the neighborhood of normal temperature being especially made with approximately 30% reduction.

No. 51 is also an alloy which was subjected to a similar cooling and rolling treatment. In this case, however, the cooling rate was excessively low and as low as about 1° C./second. The temperature of the alloy at the time when the rolling to 11.7 mm. diameter was completed was approximately 150° C., so that sufficient quenching effect and cold working effect were not obtained.

TABLE 3

[Diameter 11.7 mm.]

| Number | Compositions, percent | | | Aging conditions | Properties | | |
|---|---|---|---|---|---|---|---|
| | Mg | Si | Be | | Tensile strength, kg./mm.² | Elongation, percent [a] | Electrical conductivity, percent, IACS |
| Alloys and manufacturing method of this invention | | | | | | | |
| 35 | 0.35 | 0.30 | 0.09 | | 17.0 | 6.0 | 56.0 |
| 36 | 0.35 | 0.30 | 0.09 | 160° C. x 2 hrs | 20.9 | 10.0 | 56.8 |
| 37 | 0.35 | 0.30 | 0.09 | 160° C. x 5 hrs | 22.5 | 9.0 | 57.3 |
| 38 | 0.35 | 0.30 | 0.09 | 160° C. x 20 hrs | 23.5 | 9.8 | 59.0 |
| 39 | 0.35 | 0.30 | 0.09 | 180° C. x 2 hrs | 23.0 | 10.0 | 58.1 |
| 40 | 0.35 | 0.30 | 0.09 | 180° C. x 5 hrs | 23.5 | 9.5 | 59.3 |
| 41 | 0.35 | 0.30 | 0.09 | 180° C. x 20 hrs | 22.0 | 10.7 | 59.8 |
| 42 | 0.48 | 0.61 | 0.009 | | 19.5 | 6.5 | 52.8 |
| 43 | 0.48 | 0.61 | 0.009 | 160° C. x 2 hrs | 26.3 | 10.5 | 53.8 |
| 44 | 0.48 | 0.61 | 0.009 | 160° C. x 5 hrs | 27.4 | 10.8 | 54.8 |
| 45 | 0.48 | 0.61 | 0.009 | 160° C. x 20 hrs | 24.9 | 10.0 | 56.9 |
| 46 | 0.48 | 0.61 | 0.009 | 180° C. x 2 hrs | 26.5 | 9.6 | 55.7 |

See footnote at end of table.

TABLE 3—Continued

| Number | Compositions, percent | | | Aging conditions | Properties | | |
|---|---|---|---|---|---|---|---|
| | Mg | Si | Be | | Tensile strength, kg./mm.² | Elongation, percent [a] | Electrical conductivity, percent, IACS |
| 47 | 0.48 | 0.61 | 0.009 | 180° C. x 5 hrs | 26.3 | 9.4 | 56.7 |
| 48 | 0.48 | 0.61 | 0.009 | 180° C. x 20 hrs | 24.2 | 9.8 | 57.9 |
| Prior art | | | | | | | |
| 49 | 5.35 | 0.30 | | 530° C. x 1.5 hrs. water quenching | 11.6 | 9.5 | 56.0 |
| 50 | 0.48 | 0.61 | | 160° C. x 5 hrs. aging | 24.0 | 8.5 | 54.0 |
| Examples for comparison | | | | | | | |
| 51 | 0.48 | 0.61 | 0.009 | Inadequate cooling rate at rolling (<1° C./sec.) 160° C. x 5 hrs. aging. | 11.6 | 9.5 | 56.0 |
| 52 | 0.48 | 0.61 | 0.009 | Inadequate cooling rate at rolling (<1° C./sec.) and after cold working with about 30% reduction in area 160° C. x 5 hrs. aging. | 22.6 | 8.9 | 55.6 |
| 53 | 0.48 | 0.61 | 0.009 | 530° C. x 1.5 hrs. water quenching and after cold working with about 15% reduction in area, 160° C. x 5 hrs. aging. | 26.0 | 10.0 | 54.6 |

[a] G.L. 200 mm.

In the case of No. 52, the above-mentioned alloy of No. 51, which was not given the effect of special cooling and rolling sufficiently, was subjected to cold working with about 30% reduction at normal temperature to enhance the tensile strength before aging up to a value similar to the 19.5 kg./mm.² of No. 42.

No. 53 is a model of material given an effect similar to that of the special cooling and rolling treatment. It is an instance where sufficient quenching effect and cold working effect were given by the afore-mentioned general manufacturing method.

No. 49 and No. 50 are alloys to which the ordinary quenching and annealing treatments were given. Now, the effect of this special cooling and rolling treatment will be explained, comparing the properties obtained with those of the alloys of the prior art, No. 49 and No. 50.

No. 35 and No. 42 are alloys which were given just the special cooling and rolling treatment. The fact that this special cooling and rolling treatment brings about a remarkable aging hardening effect may perhaps be understood if No. 35 to No. 36 to No. 41, No. 42 and No. 43 to No. 48 are compared respectively. For example, if No. 35 is compared with No. 40, it is noted that tensile strength improved by 6.5 kg./mm.², elongation by 3.5% and electrical conductivity by 3.5% IACS. Phenomenally, remarkable improvement of the aging characteristics is observed. Similarly with No. 42 and No. 47, tensile strength improved by 6.8 kg./mm.², elongation by 2.9% and electrical conductivity by 3.9% IACS.

If the properties are compared with those of the prior art alloys in terms of measurement values, it will be found as follows: Under the same aging conditions (160° C. x 5 hrs.), as seen from comparison of No. 37 and No. 49, the alloy according to this invention has a tensile strength of 22.5 kg./mm.², an elongation of 9.0% and electrical conductivity of 57.3% IACS, while the prior art alloy has a tensile strength of 11.6 kg./mm.², an elongation of 9.5% and electrical conductivity of 56.0% IACS. The alloy of this invention has properties which are by far superior.

If No. 44 which is an alloy according to this invention and No. 50, which is an alloy of the prior art are compared, it is noted that No. 44 according to this invention has a tensile strength of 27.4 kg./mm.², an elongation of 10.8% and electrical conductivity of 54.8% IACS, while No. 50 of the prior art has a tensile strength of 24.0 kg./mm.², an elongation of 8.5% and electrical conductivity of 54.0% IACS. The alloy according to this invention possesses excellent combined properties.

This special cooling and rolling treatment makes it possible to dispense with the solution heat treatment and water quenching which are required when the conventional method of manufacture is employed and to greatly improve strength and electrical conductivity which are most important for electric conductors by giving the material the warm working effect and the cold working effect one after the other at the same time as the quenching effect is applied during the process of hot rolling which is a usual process in the manufacture of electric wires.

This invention has been found to provide at a low cost aluminum alloys which have peerlessly excellent combined properties as electric conductors, by synergistically making use of such various effects as the effect of berryllium, the effect of quenching, the effect of warm working, the effect of cold working, etc. The results are not what is merely given by the effect of quenching and the effect of cold working. We should like to emphasize the fact that the effect of quenching can only produce such properties as those of No. 49 and No. 50 and that the effect of cold working only can produce such properties as those of No. 52. No. 53 is an alloy having effects near to those of the present invention, having been subjected to cold working after quenching and aging treatment. If it is compared with No. 44 of this invention, however, it can be seen that the alloy according to this invention possesses superior properties. It is considered that this proves the synergistic effect of quenching, warm working and cold working.

In the case of No. 53, the manufacturing cost is higher, and it can readily be seen that the method has no advantages at all over that of the present invention.

The addition of a very small quantity of beryllium helps this special cooling and rolling treatment to display its effects and provides excellent high strength and high electrical conductivity aluminum alloys for electric conductors which have heretofore never been obtained by any method.

Example 4

Using the rods subjected to the special cooling and rolling treatment by the method described in detail in Example 3, wires of 3.5 mm. in diameter were obtained by cold working with about 91% reduction, without any further treatment in some cases and with aging under various conditions. These wires were subjected to stabilizing aging treatment under various conditions to recover their ductility and electrical conductivity, and their properties were investigated. Some of the results obtained are given in Table 4. No. 54 to No. 81 represent alloys of this invention manufactured by this new method, while No. 82 and No. 83 represent the prior art alloys manufactured by a usual method.

Where strength is considered important, it is desirable that after the special cooling and rolling treatment,

TABLE 4

[Diameter 3.5 mm.]

| Number | Compositions | | | Aging conditions before cold working | Stabilizing aging conditions after cold working [a] | Properties | | |
|---|---|---|---|---|---|---|---|---|
| | Mg | Si | Be | | | Tensile strength, kg./mm.[2] | Elongation, percent [b] | Electrical conductivity, percent, IACS |
| Alloys and Manufacturing method of this invention | | | | | | | | |
| 54 | 0.35 | 0.30 | 0.09 | | | 29.0 | 5.0 | 55.0 |
| 55 | 0.35 | 0.30 | 0.09 | | 100° C. x 5 hrs | 29.0 | 6.0 | 55.3 |
| 56 | 0.35 | 0.30 | 0.09 | | 120° C. x 5 hrs | 29.5 | 7.0 | 55.5 |
| 57 | 0.35 | 0.30 | 0.09 | | 150° C. x 5 hrs | 30.0 | 8.0 | 57.0 |
| 58 | 0.35 | 0.30 | 0.09 | | 180° C. x 5 hrs | 23.5 | 6.5 | 60.8 |
| 59 | 0.35 | 0.30 | 0.09 | 160° C. x 5 hrs | | 33.0 | 1.0 | 57.0 |
| 60 | 0.35 | 0.30 | 0.09 | 160° C. x 5 hrs | 120° C. x 5 hrs | 31.0 | 5.5 | 58.2 |
| 61 | 0.35 | 0.30 | 0.09 | 160° C. x 5 hrs | 150° C. x 5 hrs | 29.5 | 5.5 | 59.5 |
| 62 | 0.35 | 0.30 | 0.09 | 180° C. x 5 hrs | | 33.0 | 1.0 | 58.6 |
| 63 | 0.35 | 0.30 | 0.09 | 180° C. x 5 hrs | 120° C. x 5 hrs | 30.5 | 5.0 | 59.2 |
| 64 | 0.35 | 0.30 | 0.09 | 180° C. x 5 hrs | 150° C. x 5 hrs | 28.2 | 4.5 | 60.0 |
| 65 | 0.35 | 0.30 | 0.09 | 200° C. x 5 hrs | | 31.0 | 1.5 | 59.4 |
| 66 | 0.35 | 0.30 | 0.09 | 200° C. x 5 hrs | 120° C. x 5 hrs | 29.1 | 5.7 | 59.8 |
| 67 | 0.35 | 0.30 | 0.09 | 200° C. x 5 hrs | 150° C. x 5 hrs | 27.0 | 6.5 | 60.0 |
| 68 | 0.48 | 0.61 | 0.009 | | | 35.0 | 1.8 | 51.4 |
| 69 | 0.48 | 0.61 | 0.009 | | 100° C. x 5 hrs | 34.0 | 4.0 | 52.0 |
| 70 | 0.48 | 0.61 | 0.009 | | 120° C. x 5 hrs | 34.0 | 7.8 | 52.6 |
| 71 | 0.48 | 0.61 | 0.009 | | 150° C. x 5 hrs | 32.0 | 8.6 | 55.0 |
| 72 | 0.48 | 0.61 | 0.009 | | 180° C. x 5 hrs | 27.1 | 7.0 | 58.6 |
| 73 | 0.48 | 0.61 | 0.009 | 160° C. x 5 hrs | | 39.0 | 1.5 | 54.5 |
| 74 | 0.48 | 0.61 | 0.009 | 160° C. x 5 hrs | 120° C. x 5 hrs | 36.5 | 6.0 | 55.7 |
| 75 | 0.48 | 0.61 | 0.009 | 160° C. x 5 hrs | 150° C. x 5 hrs | 34.0 | 5.8 | 57.2 |
| 76 | 0.48 | 0.61 | 0.009 | 180° C. x 5 hrs | | 36.0 | 1.2 | 56.3 |
| 77 | 0.48 | 0.61 | 0.009 | 180° C. x 5 hrs | 120° C. x 5 hrs | 34.5 | 6.3 | 57.5 |
| 78 | 0.48 | 0.61 | 0.009 | 180° C. x 5 hrs | 150° C. x 5 hrs | 31.3 | 6.0 | 58.1 |
| 79 | 0.48 | 0.61 | 0.009 | 200° C. x 5 hrs | | 33.0 | 1.9 | 57.5 |
| 80 | 0.48 | 0.61 | 0.009 | 200° C. x 5 hrs | 120° C. x 5 hrs | 30.4 | 4.8 | 58.0 |
| 81 | 0.48 | 0.61 | 0.009 | 200° C. x 5 hrs | 150° C. x 5 hrs | 29.0 | 4.5 | 58.6 |
| Prior art | | | | | | | | |
| 82 | 0.35 | 0.30 | | 11.7ϕ: 530° C. x 1.5 hrs. water quenching 160° C. x 5 hrs. aging | | 23.6 | 4.5 | 58.4 |
| 83 | 0.48 | 0.61 | | 11.7ϕ- 3.5ϕ drawing, 3.5ϕ: 150° C. x 5 hrs. stabilizing aging | | 33.2 | 7.5 | 53.5 |

[a] With 91% reduction.
[b] G.L. 200 mm.

If No. 61 of this invention and No. 82 of the prior art alloy under the same aging conditions are compared, it is noted that the alloy of this invention has far more excellent combined properties, the alloy of this invention having a tensile strength of 29.5 kg./mm.[2], an elongation of 5.5% and electrical conductivity of 59.5% IACS, while the alloy of the prior art has values of 23.6 kg./mm.[2], 4.5% and 58.4% IACS respectively.

Also by comparing No. 75 of this invention and No. 83 of the prior art, it can be noted likewise that the alloy of this invention has superior properties.

What processes should be used after the special cooling and rolling treatment before the final size is obtained is determined by the consideration of which of the elements of strength, ductility and electrical conductivity should be the most important for the product manufactured.

For example, where ductility is considered to be the most important, it is preferable that cold working is done down to the final size after the special cooling and rolling treatment and then stabilizing aging is done at the final size at about 100° C.–180° C., as is the case with No. 55 to No. 58 and No. 69 to No. 72.

Where electrical conductivity is considered important, it is preferable that after the special cooling and rolling treatment, the aging treatment be applied at a comparatively high temperature (approximately 180° C.), then cold working to the finished size, and then stabilizing aging treatment be applied at 100°–150° C.

annealing aging treatment be applied at 160°–180° C. and then cold working be done down to the finished size.

Where the combined properties of strength, ductility and electrical conductivity are considered important, aging treatment is applied at 160°–180° C. after the special cooling and rolling treatment, then cold working is done down to the finished size, and then stabilizing aging treatment is applied at 120° C.–150° C.

As already stated, the new manufacturing method of this invention makes it possible to omit the solution heat treatment and water quenching process, which are required in the case of a conventional manufacturing method, by virtue of the special cooling and rolling treatment. At the same time, it remarkably improves the aging characteristics. Thus, it provides high strength aluminum alloys for electric conductors which have the combined properties unequalled by those of any other aluminum alloy for electric conductors.

Example 5

Furthermore, this invention makes it possible to provide aluminum alloys for communication cables as well as for magnet wires and other conductors in various electric machines and appliances for which copper is being rapidly replaced with aluminum in recent times.

The rod after the special cooling and rolling treatment manufactured by the method described in detail in Example 3 was drawn to a diameter of 0.5 mm., and was annealed at a comparatively high temperature of 200° C.

to 300° C. to give it an elongation and electrical conductivity which are the most important properties of such a fine wire. Some of the results thus obtained are shown in Table 5.

TABLE 5

| Number | Compositions, percent | | | Aging conditions (0.5 mm.φ) | Properties | | |
|---|---|---|---|---|---|---|---|
| | Mg | Si | Be | | Tensile strength kg./mm.² | Elongation, percent [a] | Electricial conductivity percent, IACS |
| | | | | This invention | | | |
| 84 | 0.5 | 0.30 | 0.09 | 200° C. x 1 hour | 21.0 | 6.0 | 60.5 |
| 85 | 0.5 | 0.30 | 0.09 | 230° C. x 1 hour | 17.0 | 4.5 | 61.6 |
| 86 | 0.5 | 0.30 | 0.09 | 260° C. x 1 hour | 14.4 | 8.5 | 61.9 |
| 87 | 0.5 | 0.30 | 0.09 | 300° C. x 1 hour | 12.3 | 20.0 | 61.9 |
| | | | | Prior art aluminum for electrical purposes | | | |
| 88 | 99.7% Al | | | H [b] | 25.6 | 0.5 | 61.9 |
| 89 | 99.7% Al | | | ¼ H [c] | 11.0 | 4.5 | 62.6 |
| 90 | 99.7% Al | | | O [d] | 9.8 | 24.0 | 63.1 |

[a] G.L. 250 mm.
[b] 11.7 mm.φ–0.5 mm.φ cold drawing.
[c] 11.7 mm.φ–0.56 mm.φ cold drawing—0.56 mm.φ (250° C. x 1 hr.) annealing; 11.7 mm.φ—0.50 mm.φ cold drawing.
[d] 11.7 mm.φ–0.5 mm.φ cold drawing—0.50 mm.φ (300° C. x 1 hr.) annealing.

As seen from the above Table, the present invention provides aluminum alloy wires which are found best-suited for uses where ordinary half-hard type or soft type aluminum alloys for electrical purposes are not strong enough. It is possible to manufacture wires of excellent combined properties of electrical conductivity, ductility and strength by suitably selecting heat treatment conditions, and the wire is thus being given an electrical conductivity of 60% IACS or more, an elongation of 3 to 4% or more and a tensile strength of 14 kg./mm.² or more. These nominal values can never be obtained in aluminum for electrical purposes made by way of the prior art teachings.

Now, the reason why the special cooling and rolling treatment greatly improves the subsequent aging characteristics will be considered. The solute elements, magnesium and silicon, are made a solid solution by heating them to the solution temperature shown in the equilibrium phase diagram of FIG. 1, and at the same time, such various defects as vacancies, reach a thermal equilibrium value. As it is then worked while cooling rapidly, hot working, warm working, and cold working are done continuously one after another at the same time as it receives quenching effect, so that the material is forged and at the same time the density of dislocations, vacancies, etc. increases greatly. It is imagined as stated above that the condition of the material after the special cooling and rolling treatment is such that magnesium and silicon are in a solid solution state and various such defects as dislocations, vacancies, etc. introduced have a remarkably high concentration. The dislocations, valencies, etc. work as nuclei of the precipitation layer of Mg$_2$Si, which is the strengthening factor at the subsequent aging treatment, and, after the aging treatment, contribute to the strength as a very large number of dispersed very fine precipitates. It is considered that they result in a great improvement in the electrical conductivity and ductility.

The special cooling and rolling treatment will be separated and studied macroscopically. The rolling from the solution heat temperature down to approximately 200° C. is the hot working which works for forging the material effectively. The working from 200° C. to 100° C. is the warm working, during which working and aging are repeatedly given to the material and various defects which may be called nuclei of precipitation in the subsequent aging treatment are introduced in large numbers. The cold working, which is between 100° C. and the neighborhood of normal temperature, seems to greatly increase the density of various defects like dislocations, vacancies, etc. and increase the internal stress further. If these hot, warm and cold workings are done while cooling is effected rapidly at a cooling rate of 1° C./serond or more, the quenching effect is also obtained at the same time and it is presumed that remarkable improvements in strength, ductility and electrical conductivity can be obtained by the aging treatment after the special cooling and rolling treatment.

With respect to the addition of a very small quantity of beryllium, the forming of cluster by beryllium itself is also conceivable, besides the indirect effect of the addition such as the increase in the density of vacancies. It is considered to contribute to the fine dispersion of the precipitates after the aging treatment.

As has been described in detail with reference to examples of embodiment, this invention provides high strength aluminum alloys for electric conductors which have excellent combined properties with respect to strength, electrical conductivity, ductility, workability, etc. It also shortens and simplifies the processes for the manufacture of such alloys. Thus, the invention is highly valuable for industrial applications.

We claim:

1. The method of manufacturing a high strength aluminum alloy for electric conductors comprising the steps of producing a heated alloy which comprises 0.2 to 1.2 wt.-percent magnesium, 0.1 to 0.9 wt.-percent silicon, 0.0005 to 0.4 wt.-percent beryllium and the balance essentially aluminum; cold working the produced alloy with approximately 10 to 30% reduction in area after quenching the heated alloy from in the range of about 500° C. to 550° C.; then aging the alloy at about 150° C. to 200° C.; and then cold working the alloy.

2. The method of manufacturing a high strength aluminum alloy for electric conductors comprising the steps of: producing a heated alloy which comprises 0.2 to 1.2 wt.-percent magnesium, 0.1 to 0.9 wt.-percent silicon, 0.0005 to 0.4 wt.-percent beryllium and the balance essentially aluminum; rolling while cooling the heated alloy from the neighborhood of the solution heat treatment temperature down to the neighborhood of normal temperature at a cooling rate of approximately 1° C./second or more; and cold rolling the alloy with at least about 10% reduction in area between about 100° C. and the neighborhood of normal temperature.

3. The method of claim 2 characterized by the step of cold working the alloy after the step of cold rolling.

4. The method of claim 3 characterized by the step of applying aging treatment to the alloy at about 160° C. to 200° C. after the step of cold rolling but prior to the step of cold working.

5. The method of claim 4 characterized by the step of applying stabilizing aging treatment to the cold worked alloy at about 100° C. to 150° C.

6. A high strength aluminum alloy for electric conductors manufactured by the method comprising the steps of: producing a heated alloy which comprises 0.2 to 1.2 wt.-percent magnesium, 0.1 to 0.9 wt.-percent silicon, 0.0005 to 0.4 wt.-percent beryllium and the balance essentially aluminum; cold working the produced alloy with approximately 10 to 30% reduction in area after quenching the heated alloy from in the range of about 500° C. to 550° C.; then aging the alloy at about 150° C. to 200° C.; and then cold working the alloy.

References Cited

UNITED STATES PATENTS

| | | | |
|---|---|---|---|
| 2,572,562 | 10/1951 | Harrington | 148—12.7 |
| 3,232,796 | 2/1966 | Anderson | 148—12.7 |
| 3,582,406 | 6/1971 | Ford | 148—12.7 |
| 3,113,052 | 12/1963 | Schneck | 148—12.7 |
| 3,418,177 | 12/1968 | Pryor | 148—12.7 |
| 3,464,866 | 9/1969 | Pryor | 148—12.7 |
| 3,573,035 | 3/1971 | Griffiths | 75—147 |

WAYLAND W. STALLARD, Primary Examiner